US010949861B2

(12) United States Patent
Naik et al.

(10) Patent No.: US 10,949,861 B2
(45) Date of Patent: Mar. 16, 2021

(54) SYSTEMS AND METHODS FOR DERIVING PLATFORM FEEDBACK DATA FOR DYNAMIC RETRIEVAL BY DOWNSTREAM SUBSYSTEMS

(71) Applicant: CaaStle, Inc., New York, NY (US)

(72) Inventors: Chandrashekhar Naik, Bangalore (IN); Ashish Pawar, Bangalore (IN); Georgiy Goldenberg, Los Altos, CA (US); Bharat Gupta, Bengaluru (IN); Pankaj Nautiyal, New Delhi (IN); Vikas Gupta, New Delhi (IN)

(73) Assignee: CAASTLE, INC., New York, NY (US)

( * ) Notice: Subject to any disclaimer, the term of this patent is extended or adjusted under 35 U.S.C. 154(b) by 0 days.

(21) Appl. No.: 16/385,445

(22) Filed: Apr. 16, 2019

(65) Prior Publication Data

US 2020/0334684 A1    Oct. 22, 2020

(51) Int. Cl.
*G06Q 30/06* (2012.01)
*G06Q 30/00* (2012.01)
(Continued)

(52) U.S. Cl.
CPC ....... *G06Q 30/016* (2013.01); *G06Q 10/0837* (2013.01)

(58) Field of Classification Search
CPC .................. G06Q 30/016; G06Q 10/0837
See application file for complete search history.

(56) References Cited

U.S. PATENT DOCUMENTS 6,751,657 B1    6/2004 Zothner
2011/0106721 A1    5/2011 Nickerson et al.
(Continued)

FOREIGN PATENT DOCUMENTS

EP    0645322 A1 *  3/1995  ........... B65G 1/1371

OTHER PUBLICATIONS

12Return, "A smart way to accept, ship, receive and revalue product returns," 12return.com, accessed on Feb 17, 2019 (Year: 2019).*
(Continued)

*Primary Examiner* — Jan P Mincarelli
(74) *Attorney, Agent, or Firm* — Bookoff McAndrews, PLLC (57) ABSTRACT

Disclosed are methods, systems, and non-transitory computer-readable medium for deriving platform feedback data from raw feedback data for dynamic retrieval by downstream subsystems. For example, a method may include detecting a return notification trigger of a user, identifying segment data, determining a return notification form identifier based on the segment data, loading an electronic return notification form corresponding to the return notification form identifier, receiving raw feedback data from the user device, deriving platform feedback data from the raw feedback data using a plurality of mappings stored in one or more electronic mapping databases, and storing the platform feedback data in at least one of a feedback service component and a return notification service component, in one or more formats configured for retrieval by one or more downstream subsystems associated with managing and/or analyzing the one or more wearable items.

20 Claims, 5 Drawing Sheets

(51) Int. Cl.
*G06Q 10/08* (2012.01)
*G06Q 30/04* (2012.01)

(56) References Cited

U.S. PATENT DOCUMENTS

| | | | |
|---|---|---|---|
| 2011/0320376 A1* | 12/2011 | Dearlove | G06Q 10/08 |
| | | | 705/337 |
| 2013/0009774 A1* | 1/2013 | Sabeta | G06Q 30/016 |
| | | | 340/540 |
| 2013/0191180 A1 | 7/2013 | Teo et al. | |
| 2014/0257927 A1* | 9/2014 | Brock | G06Q 30/016 |
| | | | 705/7.31 |
| 2014/0289160 A1 | 9/2014 | Stovall | |
| 2015/0348146 A1 | 12/2015 | Shanmugam et al. | |
| 2016/0004993 A1* | 1/2016 | Bims | G06Q 10/087 |
| | | | 705/28 |
| 2016/0042351 A1 | 2/2016 | Syed et al. | |
| 2018/0191644 A1* | 7/2018 | Campos | G06F 16/9535 |

OTHER PUBLICATIONS

International Search Report and Written Opinion issued in International Application No. PCT/US20/28056, dated Jul. 1, 2020 (12 pages).

* cited by examiner

SYSTEMS AND METHODS FOR DERIVING PLATFORM FEEDBACK DATA FOR DYNAMIC RETRIEVAL BY DOWNSTREAM SUBSYSTEMS

TECHNICAL FIELD

Various embodiments of the present disclosure generally relate to an electronic platform for distribution of wearable items and, more particularly, storing user feedback data at a server system in such a way that the feedback data may be effectively retrieved.

BACKGROUND

Online service provider systems may collect user feedback at an electronic platform. Collecting user feedback data and electronically rendering the feedback data to other subsystems may help generate useful analytics data associated with user transactions, inventories, and operations of the online service. However, there may be multiple different versions of electronic feedback forms to be utilized for collecting user feedback data, depending on circumstances such as technical contexts, users, or segments. For example, because some mobile application users may not update their applications to the latest version in a certain time frame, the online service provider systems may be running different versions of electronic feedback forms for user interfaces of different users. In addition, different vendors or platform tenants may, for example, require utilizing differently arranged electronic feedback forms to suit their own needs. Thus, it may be highly desirable for an online service provider system to be able to dynamically render different types of feedback forms onto different user interfaces. It may also be highly desirable for an online service provider system to be able to dynamically map the elements collected from different electronic feedback forms to a uniform set of core metrics that may be utilized by other subsystems of the online service provider system.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for deriving platform feedback data from user feedback data associated with online transactions.

In one embodiment, a computer-implemented method is disclosed for deriving platform feedback data from raw feedback data for dynamic retrieval by downstream subsystems. The computer-implemented method may comprise: detecting, by one or more processors, a return notification trigger of a user for one or more wearable items physically shipped to the user in response to one or more electronic transactions; in response to detecting the return notification trigger, identifying, by the one or more processors, segment data associated with at least one of the user and the one or more wearable items; determining, by the one or more processors, a return notification form identifier based on the segment data, the return notification form identifier uniquely identifying an electronic form to be filled out by the user; loading at one or more user interfaces of a user device of the user, by the one or more processors, an electronic return notification form corresponding to the return notification form identifier; receiving, by the one or more processors, via the electronic return notification form, raw feedback data from the user device; deriving, by the one or more processors, platform feedback data from the raw feedback data using a plurality of mappings stored in one or more electronic mapping databases, wherein the plurality of mappings include one or more predefined mappings between a first data set associated with the raw feedback data and a second data set associated with the platform feedback data; and storing, by the one or more processors, the platform feedback data in at least one of a feedback service component and a return notification service component, in one or more formats configured for retrieval by one or more downstream subsystems associated with managing and/or analyzing the one or more wearable items.

In accordance with another embodiment, a computer system is disclosed for deriving platform feedback data from raw feedback data for dynamic retrieval by downstream subsystems. The computer system may comprise: a memory having processor-readable instructions stored therein; and at least one processor configured to access the memory and execute the processor-readable instructions, which when executed by the processor configures the processor to perform a plurality of functions, including functions for: detecting a return notification trigger of a user for one or more wearable items physically shipped to the user in response to one or more electronic transactions; in response to detecting the return notification trigger, identifying segment data associated with at least one of the user and the one or more wearable items; determining a return notification form identifier based on the segment data, the return notification form identifier uniquely identifying an electronic form to be filled out by the user; loading at one or more user interfaces of a user device of the user an electronic return notification form corresponding to the return notification form identifier; receiving via the electronic return notification form, raw feedback data from the user device; deriving platform feedback data from the raw feedback data using a plurality of mappings stored in one or more electronic mapping databases, wherein the plurality of mappings include one or more predefined mappings between a first data set associated with the raw feedback data and a second data set associated with the platform feedback data; and storing the platform feedback data in at least one of a feedback service component and a return notification service component, in one or more formats configured for retrieval by one or more downstream subsystems associated with managing and/or analyzing the one or more wearable items.

In accordance with another embodiment, a non-transitory computer-readable medium containing instructions is disclosed for deriving platform feedback data from raw feedback data for dynamic retrieval by downstream subsystems. The non-transitory computer-readable medium may comprise instructions for: detecting a return notification trigger of a user for one or more wearable items physically shipped to the user in response to one or more electronic transactions; in response to detecting the return notification trigger, identifying segment data associated with at least one of the user and the one or more wearable items; determining a return notification form identifier based on the segment data, the return notification form identifier uniquely identifying an electronic form to be filled out by the user; loading at one or more user interfaces of a user device of the user an electronic return notification form corresponding to the return notification form identifier; receiving via the electronic return notification form, raw feedback data from the user device; deriving platform feedback data from the raw feedback data using a plurality of mappings stored in one or more electronic mapping databases, wherein the plurality of mappings include one or more predefined mappings between a first data set associated with the raw feedback data and a second data set associated with the platform feedback data; and storing the platform feedback data in at least one of a feedback service component and a return notification service component, in one or more formats configured for retrieval by one or more downstream subsystems associated with managing and/or analyzing the one or more wearable items.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The following embodiments describe systems and methods for deriving platform feedback data from user feedback data associated with online transactions. When a server system of an online service provider detects a trigger associated with a return notification (e.g., a notification of a return of an item shipped to the user) from a user, the server system may prompt a user to input some feedback, such as, for example, the user's experience with the item being returned. The received feedback may be used by other subsystems as relevant metrics or analytics for the online service. The feedback may be received using an electronic form rendered at the user's device. However, different versions of electronic feedback form may be rendered for different circumstances or user types. Thus, to transform a variety of raw feedback data into a set of standardized core metrics, the server system may generate and maintain a plurality of mappings between a first data set associated with the raw feedback data and a second data set associated with a standardized, platform feedback data. The server system may use the plurality of mappings to generate platform feedback data based on raw feedback data, and the resulting platform feedback data may be stored in one or more formats configured for retrieval by one or more downstream subsystems associated with the server system.

While the exemplary system architecture as described in the present disclosure relates to electronic transactions for subscribing to, purchasing, or renting wearable items (e.g., clothing-as-a-service (CaaS) or Try-Then-Buy (TTB) service), implementations disclosed herein may effectively serve various other online transactions in the context of any other subscription, purchase, rental, or retail services without departing from the scope of the disclosure, such as, for example, subscribing to or making purchases in a software service, cleaning service, delivery service, maintenance service, rental product, rental vehicles, etc. In addition, while some descriptions and examples disclosed in the present disclosure refer to certain exemplary transactions as transactions pertaining to "apparel" or "garments," all of those transactions may effectively serve any wearable item (e.g., an article of clothing, apparel, jewelry, hat, accessories, or any other product which may be worn), or even hospitality linens, consumer goods, or any other textile fabrics, without departing from the scope of the disclosure.

As used in the present disclosure, the term "CaaS" (i.e., clothing-as-a-service) may collectively refer to computer-implemented services and functions associated with subscription, purchase, and/or rental services for users (e.g., periodic subscription for receiving wearable items, apparel rental or purchase order, distribution, return processing, TTB services, account management, marketing, customer service, warehouse operations, etc.). As used in the present disclosure, the term "wearable item" may refer to any article of clothing, apparel, jewelry, hat, accessories, or other product which may be worn by a person, an animal, or a thing, or be used as an ornament for a person, an animal, or a thing. As used herein, the term "closeting" or "to closet" may refer to a computer-implemented operation of placing one or more garments into a virtual closet (e.g., a cart, a repository, or any type of space which may be virtually associated with a particular set of one or more garments for a future transaction). Further, as used in the present disclosure, the term "wearability" may refer to a propensity or a probability of one or more users actually wearing a given garment, and the term "wearability metric" may be a metric indicating a level of wearability.

In accordance with the present disclosure, user interfaces, databases, periodically executed data exchange tasks run by subsystems of a server system, and automations being integrated together in a connected platform may be achieved by a uniquely configured system architecture, job execution clusters or components configuring one or more processors to perform both storefront and back office tasks, and various user interfaces providing specialized or customized access to users of different roles. For example, the system may periodically and/or dynamically obtain data attributes of each user's relationship with certain apparel (e.g., a binary flag of whether a shipped garment was actually worn by a user) by receiving and generating various forms of user feedback data, and train a neural network with those data sets to make specific front-end user recommendations with highly wearable apparel. The ordered combination of various ad hoc and automated tasks in the presently disclosed platform necessarily achieve technological improvements through the specific processes described more in detail below. In addition, the unconventional and unique aspects of these specific automation processes represent a sharp contrast to merely providing a well-known or routine environment for performing a manual or mental task.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Figure 1:
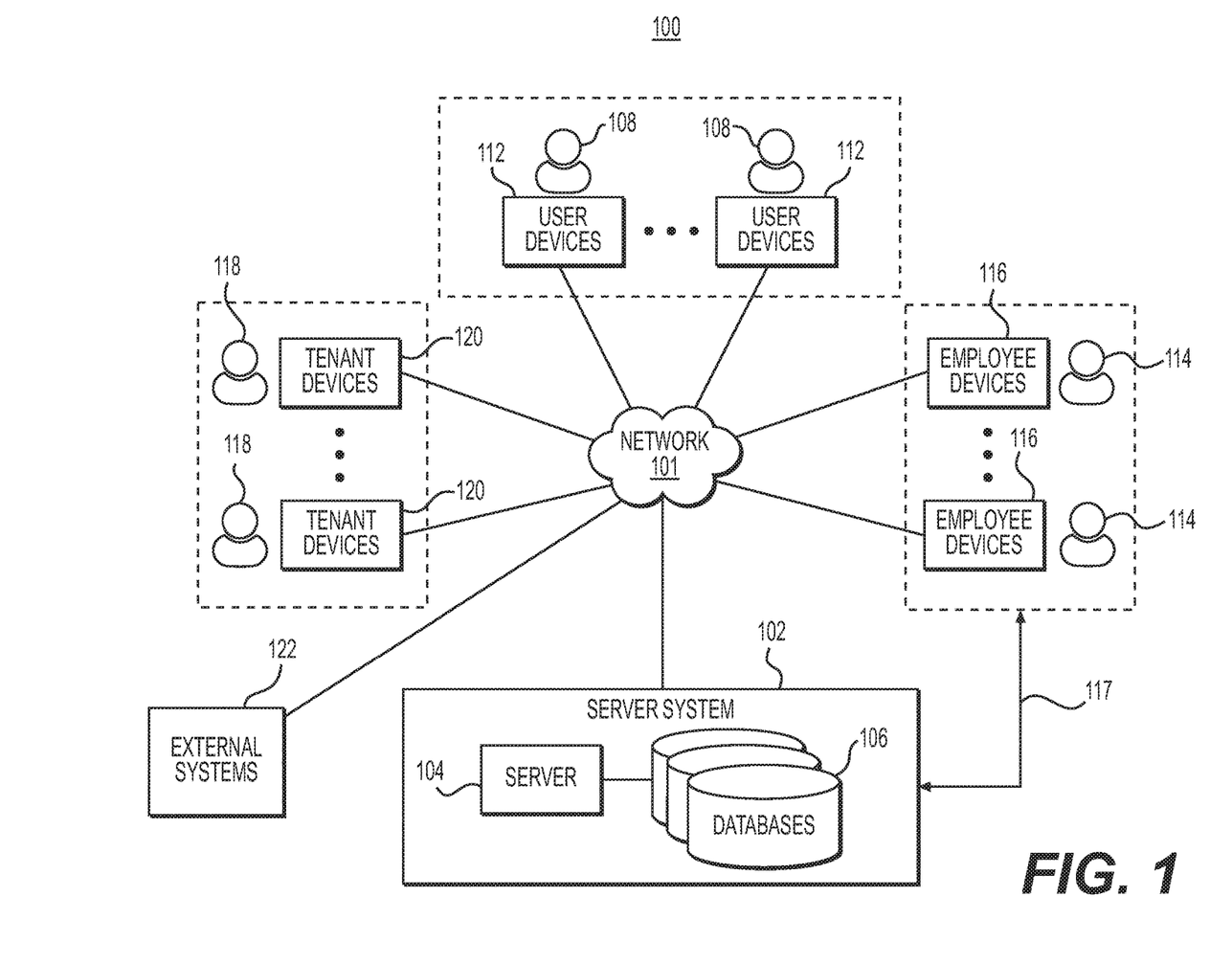
FIG. 1 depicts an example environment in which methods, systems, and other aspects of the present disclosure may be implemented.

Referring now to the appended drawings, FIG. 1 shows an example environment 100, according to one or more embodiments of the present disclosure. As shown, the example environment 100 may include one or more networks 101 that interconnect a server system 102, user devices 112, employee devices 116, tenant devices 120, and external systems 122. The one or more networks 101 may be, for example, one or more of a cellular network, a public land mobile network, a local area network, a wide area network, a metropolitan area network, a telephone network, a private network, an ad hoc network, an intranet, the Internet, a fiber optic based network, a cloud computing network, etc. User devices 112 may be accessed by users 108, employee devices 116 may be accessed by authorized employees 114, and tenant devices 120 may be accessed by employees of tenant entities 118. In some implementations, employee devices 116 may be used to perform the functions of the tenant devices 120 and/or the user devices 112. Server system 102 may comprise one or more servers 104 and one or more databases 106, which may be configured to store and/or process a plurality of data, microservices, and service components, and/or associated functions thereof, as described in more detail below with respect to FIGS. 2 and 3.

Users 108 may access the server system 102 through the one or more networks 101 using user devices 112. Each device among the user devices 112 may be any type of computing device (e.g., personal computing device, mobile computing devices, etc.) which allows users 108 to display a web browser or a web-based application for accessing the server system 102 through the network 101. The user devices 112 may, for example, be configured to display a web browser, a web-based application, or any other user interface for allowing users 108 to exchange information with other device(s) or system(s) in the environment 100 over the one or more networks 101. For example, a device among the user devices 110 may load an application with a graphical user interface (GUI), and the application may display on the GUI one or more apparel recommendations for closeting by the user. Users 108 accessing user devices 112 may be, for example, users and/or potential users of apparel made available for subscription-based distribution via electronic transactions and physical shipment. Additionally, or alternatively, users 108 may access user devices 112 to, for example, manage one or more user accounts, view catalogs, configure one or more user profiles, engage in customer service communications, make purchase orders, track shipments, generate shipments, monitor order fulfillment processes, initiate or process returns, order apparel for purchase, provide feedback, refer other users, navigate through various features such as size advisor, perform personalized discovery, and/or make recommendations.

Employee devices 116 may be configured to be accessed by one or more employees 114, including, for example, customer service employees, marketer employees, warehouse employees, analytics employees, or any other employees who are authorized and/or authenticated to perform tasks, operations, and/or transactions associated with the server system 102, and/or the external systems 122. In one embodiment, employee devices 116 are owned and operated by the same entity or at least an affiliate of the entity operating the e-commerce (e.g., CaaS) business hosted on server systems 102. Each device among the employee devices 116 may be any type of computing device (e.g., personal computing device, mobile computing devices, etc.). The employee devices 116 may allow employees 114 to display a web browser or an application for accessing the server system 102 and/or the external systems 122, through the one or more networks 101. For example, a device among the one or more of the employee devices 116 may load an application with graphical user interface (GUI), and the application may display on the GUI one or more warehouse operations associated with providing CaaS to users 108. In some implementations, the employee devices 116 may communicate directly with the server system 102 via communications link 117 bypassing public networks 101. Additionally, or alternatively, the employee devices 116 may communicate with the server system 102 via network 101 (e.g., access by web browsers or web-based applications).

Tenant devices 120 may be configured to be accessed by one or more tenants 118. Each device among the tenant devices 120 may be any type of computing device (e.g., personal computing device, mobile computing devices, etc.). As used herein, each tenant, among one or more tenants 118, may refer to an entity that allocates and/or supplies one or more specific collections of apparel for the CaaS inventory. For example, each of the one or more tenants 118 may be a retailer, a designer, a manufacturer, a merchandizer, or a brand owner entity that supplies one or more collections of wearable items to the CaaS inventory managed and/or accessed by the server system 102. Tenants 118 may use one or more electronic tenant interfaces (e.g., a catalog content management system associated with each tenant) to provide the server system 102 with wearable item data that describe apparel or wearable items made available for electronic transactions on server system 102. For example, one or more catalogs for each of the one or more tenants 118 may be generated and/or updated at the server system 102 dynamically and/or periodically. Tenant devices 120 may serve as access terminals for the tenants 118, for communicating with the electronic tenant interfaces and/or other subsystems hosted at the server system 102. The tenant devices 120 may, for example, be configured to display a web browser, an application, or any other user interface for allowing tenants 118 to load the electronic tenant interfaces and/or exchange data with other device(s) or system(s) in the environment 100 over the one or more networks 101.

External systems 122 may be, for example, one or more third party and/or auxiliary systems that integrate and/or communicate with the server system 102 in performing various CaaS tasks. External systems 122 may be in communication with other device(s) or system(s) in the environment 100 over the one or more networks 101. For example, external systems 122 may communicate with the server system 102 via API (application programming interface) access over the one or more networks 101, and also communicate with the employee devices 116 via web browser access over the one or more networks 101.

As indicated above, FIG. 1 is provided merely as an example. Other examples that differ from the example environment 100 of FIG. 1 are contemplated within the scope of the present embodiments. In addition, the number and arrangement of devices and networks shown in system 100 are provided as an example. In practice, there may be additional devices, fewer devices and/or networks, different devices and/or networks, or differently arranged devices and/or networks than those shown in system 100. Furthermore, two or more devices shown in FIG. 1 may be implemented within a single device, or a single device shown in FIG. 1 may be implemented as multiple, distributed devices. Additionally, or alternatively, one or more devices may perform one or more functions of other devices in the example environment 100. For example, employee devices 116 may be configured to perform one or more functions of tenant devices 120, in addition to their own functions.

Figure 2:
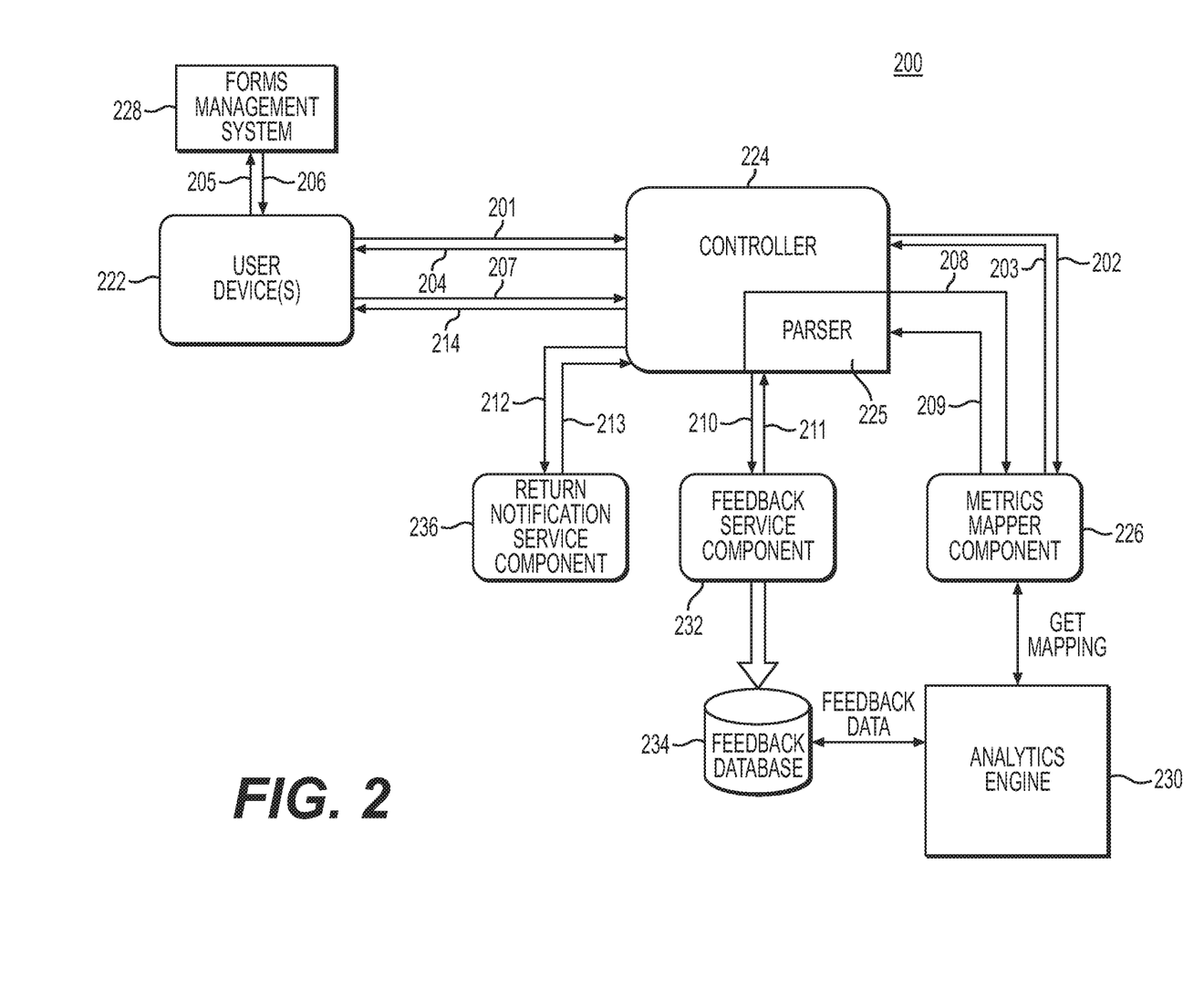
FIG. 2 depicts a schematic diagram showing an exemplary process for receiving raw feedback data from a first type of user device and deriving platform feedback data at an integrated computing environment, according to one or more embodiments.

FIG. 2 depicts a schematic diagram showing an exemplary process 200 for receiving raw feedback data from a first type of user device and deriving platform feedback data at an integrated computing environment, according to one or more embodiments. The first type of user device may include, for example, a mobile computing device configured to execute applications, such as a smartphone, a tablet computing device, any computing device running a mobile operating system, or the like. Additionally, the first type of user device may also include a device of any other type that is configured to access web-based user interfaces and/or communicate with one or more networks, such as personal computing device or a client terminal device of any computing environment.

The exemplary process 200 may be executed in an integrated computing environment. The integrated computing environment may include and/or interconnect various components, such as user device(s) 222, controller 224, parser 225, metrics mapper component 226, forms management system 228, analytics engine 230, feedback service component 232, feedback database 234, and return notification service component 236. These components 222-236 may be, for example, a set of computer-readable instructions that configure one or more processors of the server system 102, or a system among the external systems 122, to perform the functions of the exemplary process 200. Additionally, or alternatively, each of the components 222-236 may be an executable microservice (e.g., modular system) being executed in the server system 102 using the computing resources of the server system 102, and/or an executable service component in external systems 122 that configures one or more processors in the environment 100 to perform the functions of the exemplary process 200. For example, the controller 224 may be an executable microservice among microservices in communication with the server system 102, and the forms management system 228 may be an executable service component among the external systems 122 in the environment 100 depicted in FIG. 1.

At step 201, the controller 224 may receive a request for a return notification form identifier, from a user device 222. Such a request may be initiated when the user device 222 and/or the controller 224 detects a return notification trigger. In some implementations, a user device 222 may correspond to a device among the user devices 112, and a user of the user device 222 may correspond to a user among the users 108. The return notification trigger may be an incoming communication and/or an input data at the user device 222 and/or the controller 224 that indicates, for example, a selection to return one or more items that the user purchased, rented, or received via a CaaS transaction. The selection to return one or more items may include, for example, a selection entered by the user at a user interface to return one or more items, a selection entered by a user at a user interface to generate a shipping label for a return transaction, or a detection of an automated or scheduled task for returning a previously transacted wearable item in accordance with one or more preconfigured settings. Additionally, or alternatively, the return notification trigger may be, for example, an incoming communication and/or an input at the user device 222 and/or the controller 224 that indicates that the user at the user device 222 made a selection to cancel an ongoing CaaS transaction at any stage of the transaction.

After receiving the request for a return notification form, the controller 224 may determine a return notification form identifier for the user who made the request. In order to determine the return notification form as accurately as possible, the controller 224 may first identify a segment associated with the return notification trigger (e.g., a segment associated with the wearable item(s) being returned, the wearable item(s) being cancelled, or the user providing the return notification). Each segment may be mapped to a specific return notification form identifier. If a return notification trigger is associated with more than one segments (e.g., a segment corresponding to a first SKU (stock keeping unit) being returned, a segment corresponding to a second SKU being returned, and a segment corresponding to a characteristic of the user), then the segments may be prioritized based on one or more predetermined priority rules. A mapping of each segment to its corresponding return notification form identifier may be stored in databases of metrics mapper component 226 and/or analytics engine 230. An example of such mappings is shown in Table 1 below.

TABLE 1

| Priority | Segment | Segment Type | Return Notification Form Identifier |
|---|---|---|---|
| 1 | premium_brands | SKU | f1 |
| 2 | brand_xyz | SKU | f2 |
| 3 | segment_high_closeters | User | f3 |

At step 202, the controller 224 may send a request to the metrics mapper component 226, to determine the return notification form identifier using the mapping of each segment to its corresponding return notification form identifier (e.g., Table 1 shown above). In some implementations, the request to the metrics mapper component 226 may be a query being sent with input parameters, the input parameters including segment data associated with the return notification trigger. After one or more look-up operations (e.g., a database query based on the segment data) at, for example, the mappings of each segment to its corresponding return notification form identifier, the controller 224 may determine, at step 203, the return notification form identifier via communicating the resulting identifier with the metrics mapper component 226. At step 204, the controller 224 may transmit the determined return notification form identifier to user device 222 as a response to the request made by the user device in step 201.

At step 205, the user device 222 may communicate with forms management system 228 to initiate a return notification feedback input process based on the return notification form identifier obtained from the controller 224. At step 206, the forms management system 228 may communicate with the user device 222 to load an electronic return notification form associated with the return notification form identifier, at a user interface of the user device 222. In some implementations, the forms management system 228 may retrieve an existing return notification form, by querying one or more databases (e.g., one or more databases among databases 106 or databases in external systems 122) using the return notification form identifier as a parameter. In some implementations, the forms management system 228 may be an executable service component among the external systems 122, communicating with the user device 222 and the controller 224.

In some implementations, during the process of loading a return notification form, the forms management system 228 and/or the user device 222 may collect data indicative of a container information (e.g., information about a container associated with a particular device platform) of the user device 222, in order to generate a return notification form that is specific to the container corresponding to the user device 222. For example, the forms management system 228 and/or the user device 222 may include a form configuration data file that provides default return notification form identifier for a particular container (e.g., for a container specific to a particular mobile operating system, or a container specific to use of web browsers). The forms management system 228 and/or the user device 222 may additionally include an SDK (Software Development Kit) that is configured to render the appropriate return notification form on the user interface of the user device 222 by selecting a return notification form at run time from the form configuration data file. For each container (e.g., among the containers corresponding to various device platforms), there may be an SDK integrated therewith, in order to be able to render the most compatible return notification form on the user interface of the user device 222.

In some implementations, the forms management system 228 may generate the return notification form to be loaded at the user device 222, by using forms management data sets stored in one or more forms management databases (e.g., one or more databases among databases 106). An example of the forms management data sets is shown in Table 2 below.

TABLE 2

| Data set | Data included in the data set |
|---|---|
| Question pool | List of a plurality of questions, each question including a unique question identifier |
| Question config | List of questions in the required return notification form A map that matches each return notification form with the question identifiers belonging to the form |
| Form identifier map | A map of form names to return notification form identifiers |

The communications between user device 222 and the forms management system 228 (e.g., steps 205 and 206) may also include receiving raw feedback data from a user (e.g. a user among the users 108) of the user device 222 using the loaded return notification form. As used herein, raw feedback data may refer to the feedback data entered by the user at the user device 222 based on the return notification form loaded at the user device 222. In some implementations, receiving of the raw feedback data at the return notification feedback form may be performed in an iframe (inline frame) loaded at the user device 222. After the user of the user device 222 enters raw feedback data corresponding to the loaded return notification form, the raw feedback data may be transmitted, at step 207, to the forms management system 228 and/or the controller 224 for further processing. In some implementations, the user device 222 may transmit the raw feedback data only to the forms management system 228, and the forms management system 228 may then transmit the raw feedback data to the controller 224 as an immediate response, a scheduled task, or a response to a data pull from controller 224.

After the controller 224 receives the raw feedback data, the controller 224 may then parse the raw feedback data at the parser 225. The parser 225 may be a subcomponent of the controller 224, or alternatively, the parser 225 may be a component in communication with the controller 224. In some implementations, the parser 225 may parse the raw feedback data into one or more attributes, and request the metrics mapper component 226, at step 208, to use a plurality of mappings stored in metrics mapper component 226 and/or the analytics engine 230 in order to derive the platform feedback data from the attributes of the raw feedback data. The plurality of mappings may include one or more predefined mappings between a first data set associated with the raw feedback data and a second data set associated with the platform feedback data. Alternatively, the parser 225 may send the request to the metrics mapper component 226 without having to parse data attributes from the raw feedback data.

In order to generate and/or maintain the plurality of mappings that accurately map the raw feedback data to corresponding platform feedback data, the metrics mapper component 226 and/or the analytics engine 230 may be in communication with one or more databases that include baseline data sets serving as the data source for the mappings. Examples of such baseline datasets are shown in Table 3 below.

ment, brand of wearable item, vendor preference, version of the mobile application being executed on the user device 222, etc.). On the other hand, platform form identifiers, platform question identifiers, and platform answer identifiers may be immutable, because they may be utilized as a uniform set of core metrics that may be retrieved by other subsystems of the environment 100.

At step 209, the metrics mapper component 226 may transmit the derived platform feedback data to the controller 224, in response to the request made at the step 208. In some implementations, the metrics mapper component 226 may include an application programming interface (API) to metrics mapper data, while the metrics mapper data (e.g., the maps and the baseline data sets discussed above) may be data stored in databases (e.g., databases 106, or databases in

TABLE 3

| Baseline data sets | Data included in the data sets |
|---|---|
| Return Notification Form Question Map (for raw feedback data) | Each form version mapped to a set of questions Each question corresponding to unique question identifier Each question identifier must be unique across all forms |
| Return Notification Form Answer Map (for raw feedback data) | Each form version mapped to a set of answers Each answer corresponding to unique answer identifier Each answer identifier may be unique across all forms |
| Platform Question Map (for platform feedback data) | A list of both unique and immutable questions Each question corresponding to a unique identifier |
| Platform Answer Map (for platform feedback data) | A list of unique and immutable answers Each answer will have a unique identifier |
| Platform dimension Map (for platform feedback data) | Each question may be a dimension Each dimension may have a set of unique values Each value may have a unique identifier |
| Platform form map (for platform feedback data) | Each form in the platform corresponding to a unique form version Each form version may have a unique identifier |

Based on the baseline data sets, the metrics mapper component 226 and/or the analytics engine 230 may generate and/or maintain the plurality of mappings. As a result, the plurality of mappings may include, for example, at least a first map that matches each return notification form identifier to a platform form identifier, a second map that matches each return notification form question identifier to a platform question identifier, and a third map that matches each return notification form answer identifier to a platform answer identifier. The first, second, and third maps may be preconfigured such that, the first map includes every return notification form identifier (e.g., with each version having its own identifier) being mapped to a corresponding platform form, while the second and third maps dynamically update to accurately reflect these mappings. In these maps, the return notification form identifier, the return notification form question identifier, and the return notification form answer identifier may be updated as needed, because the return notification forms rendered for users at user device(s) 222 may vary depending on circumstances (e.g., user segmetrics mapper component 226 and/or analytics engine 230) that are in communication with the metrics mapper component 226. Under these implementations, the metrics mapper component 226 may be configured to, for example, receive a return identification form identifier and some raw feedback data, and communicate with the metrics mapper data via the API in order to generate mapped data such as raw question identifier, raw question text, raw answer identifier, aw answer text, platform dimension values, etc. An example of mapped data in which raw feedback data has been mapped to platform feedback data by the metrics mapper component 226 is shown in Table 4 below.

TABLE 4

| Raw Form ID | Raw Question ID | Raw Question Text | Raw Answer ID | Raw Answer Text | Platform Dimension Key | Platform Dimension Value |
|---|---|---|---|---|---|---|
| f1 | f1.q1 | Did you wear it? | f1.q1.a1 | "Yes" | 1 | Wear |
| f1 | f1.q1 | Did you wear it? | f1.q1.a2 | "No" | 2 | Did not wear |
| f1 | f1.q1 | Did you wear it? | f1.q1.a2 | "Just tried it on" | 2 | Did not wear |
| f1 | f1.q2 | How did it fit? | f1.q2.a1 | "Great!" | 1 | Great fit |
| f1 | f1.q2 | How did it fit? | f1.q2.a2 | "Good!" | 2 | Okay fit |
| f1 | f1.q2 | How did it fit? | f1.q2.a2 | "Okay!" | 2 | Okay fit |

At step 210, the parser 225 in communication with the controller 224 may parse the attributes of the received platform feedback data, so that the attributes may be transmitted to feedback service component 232, and be stored at the feedback database 234. Alternatively, at step 210, the controller 224 may transmit the received platform feedback data to feedback service component 232 without having to parse or separate different attributes of the platform feedback data. At step 211, the feedback service component may also transmit responses back to controller 224, such as, for example, an acknowledgement of receipt. In some implementations, the platform feedback data may be stored at feedback database 234 under BLOB (binary large object) data type.

Additionally, the feedback database 234 may be in communication with the analytics engine 230, and may be configured to provide the platform feedback data to analytics engine 230. This communication may, advantageously, enable the platform feedback data to be available for retrieval from various downstream subsystems of the server system 102. In some implementations, the platform feedback data may be stored in analytics engine 230 in one or more formats configured for retrieval by other subsystems of the server system 102. For example, by being stored at the analytics engine 230, the platform feedback data may be used as historical data attributes for generating wearability metrics corresponding to, for example, each pair of a user and a SKU possible for CaaS transactions. Various embodiments of determining wearability metrics of wearable items are disclosed, for example, in U.S. patent application Ser. No. 16/275,989, filed Feb. 14, 2019, entitled "Systems and Methods for Automatic Apparel Wearability Model Training and Prediction," which is incorporated herein by reference in its entirety. As another example, the platform feedback data may be used as fit ratings of the wearable items available for CaaS distribution. For example, as shown in Table 4 above, user feedback corresponding to fit-related questions such as "how did it fit?" may be received from a user, be converted to platform feedback data (e.g., platform dimension value) in accordance with mappings in metrics mapper component 226 and/or analytics engine 230, and generate fit ratings attributes about each SKU. The fit ratings attributes may be used, for example, as parameters in automated personalized garment recommendations and/or virtual closet assistant functions to CaaS users. In addition, the platform feedback data may be used as one or more merchandise demand metrics for SKUs, and the one or more merchandise demand metrics may be used by merchandising subsystems in planning inventory assortment (e.g., budget, quantity, etc.) for future cycles.

At step 212, the controller 224 may also transmit the received platform feedback data to return notification service component 236, and receive a response back at step 213 (e.g., acknowledgement of receipt, follow-up inquiry, etc.). The return notification service component 236 may maintain, or communicate with, databases storing the received platform feedback data, in order to keep track of the return notifications received from the users. In some implementations, the platform feedback data may be stored in these databases in one or more formats configured for retrieval by other subsystems of the server system 102. The return notification service component 236 may also, for example, provide the platform feedback data to a replenishment system of the server system 102, as attributes associated with user's return notification. These attributes may be used by the replenishment system as a trigger to generate replenishment identifiers (e.g., an identifier generated in response to a subscriber's return notification, for preparing or recommending next shipment to the subscriber).

Figure 3:
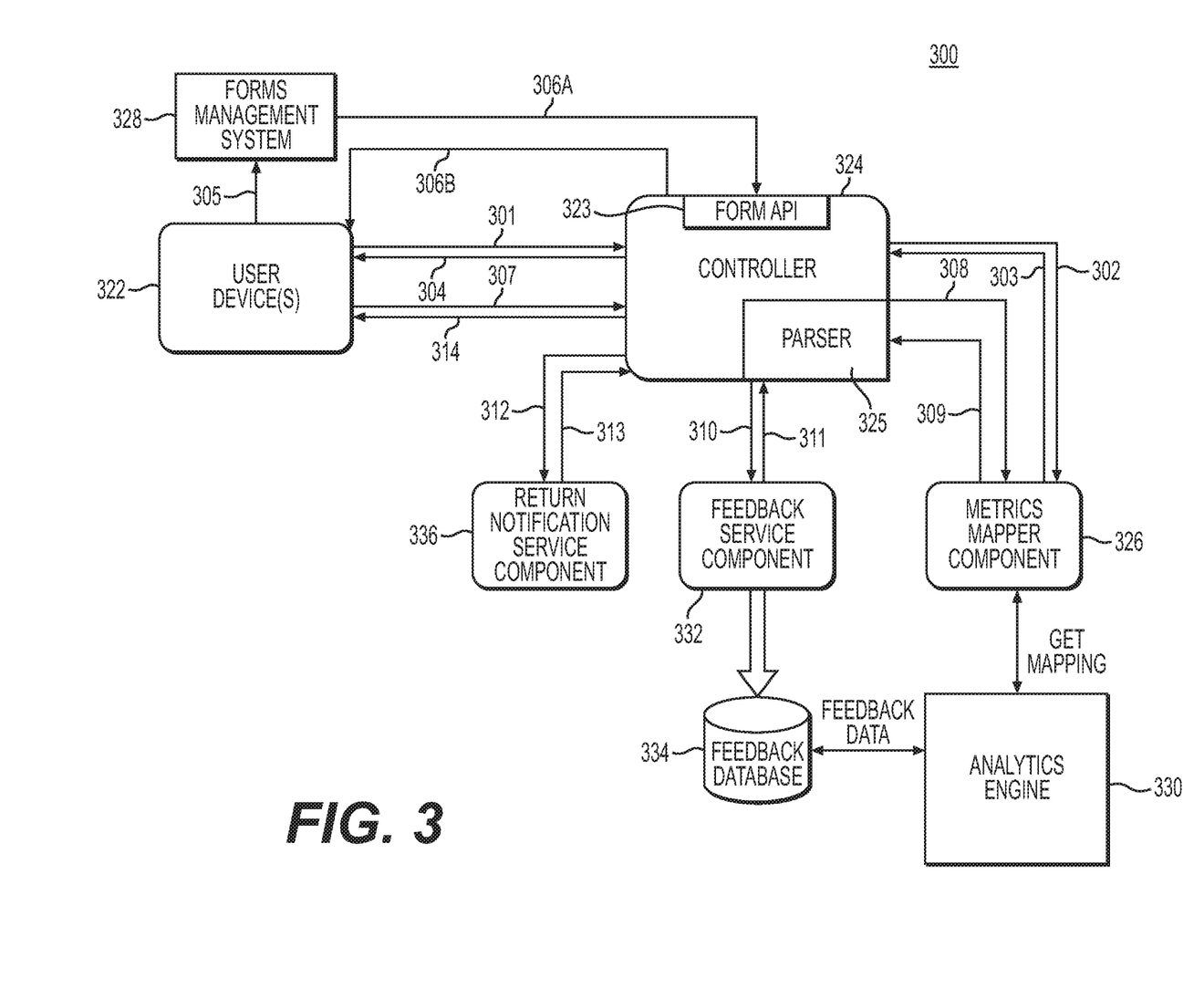
FIG. 3 depicts a schematic diagram showing an exemplary process for receiving raw feedback data from a second type of user device and deriving platform feedback data at an integrated computing environment, according to one or more embodiments.

FIG. 3 depicts a schematic diagram showing an exemplary process 300 for receiving raw feedback data from a second type of user device and deriving platform feedback data at an integrated computing environment, according to one or more embodiments. The second type of user device may include, for example, a computing device configured to execute one or more web browsers for communicating with one or more networks. Additionally, the second type of user device may also include a device of any other type that is configured to access web-based user interfaces and/or communicate with one or more networks.

At step 306A, the forms management system 328 may detect that a user completed data entry into a return notification feedback form, and subsequently redirect a user at the user device 322 to a page that interfaces with the controller 324. The redirecting may be implemented, for example, by loading the return notification feedback form in an iframe loaded at the user device 322, and after completion of the form data entry process, redirecting the user back to a page operated by the controller 324. In response to step 306A, a form API 323 of the controller 324 may interface with the forms management system 328 in order to obtain the user's raw feedback data that was collected by the forms management system 328 via the electronic return notification form. Using the obtained raw feedback data, the controller 324 may, at step 306B, transmit or load the raw feedback data onto a parent frame of the user interface of the user device 322. Using the raw feedback data received at the user device 322 in step 306B, the user device 322 may then proceed to transmit raw feedback data to the controller 324 for further processing.

Aside from steps 306A, 306B, and form API 323 described above, FIG. 3 depicts elements (e.g., component and steps) that each correspond to an element of FIG. 2. Between FIG. 2 and FIG. 3, corresponding elements are those having matching reference numerals except for the hundredth digit. Thus, steps 301-305, steps 307-425, user device(s) 322, and components 324-336 of the exemplary process 300 have been described in detail above, with respect to the corresponding elements in the exemplary process 200 of FIG. 2.

Figure 4:
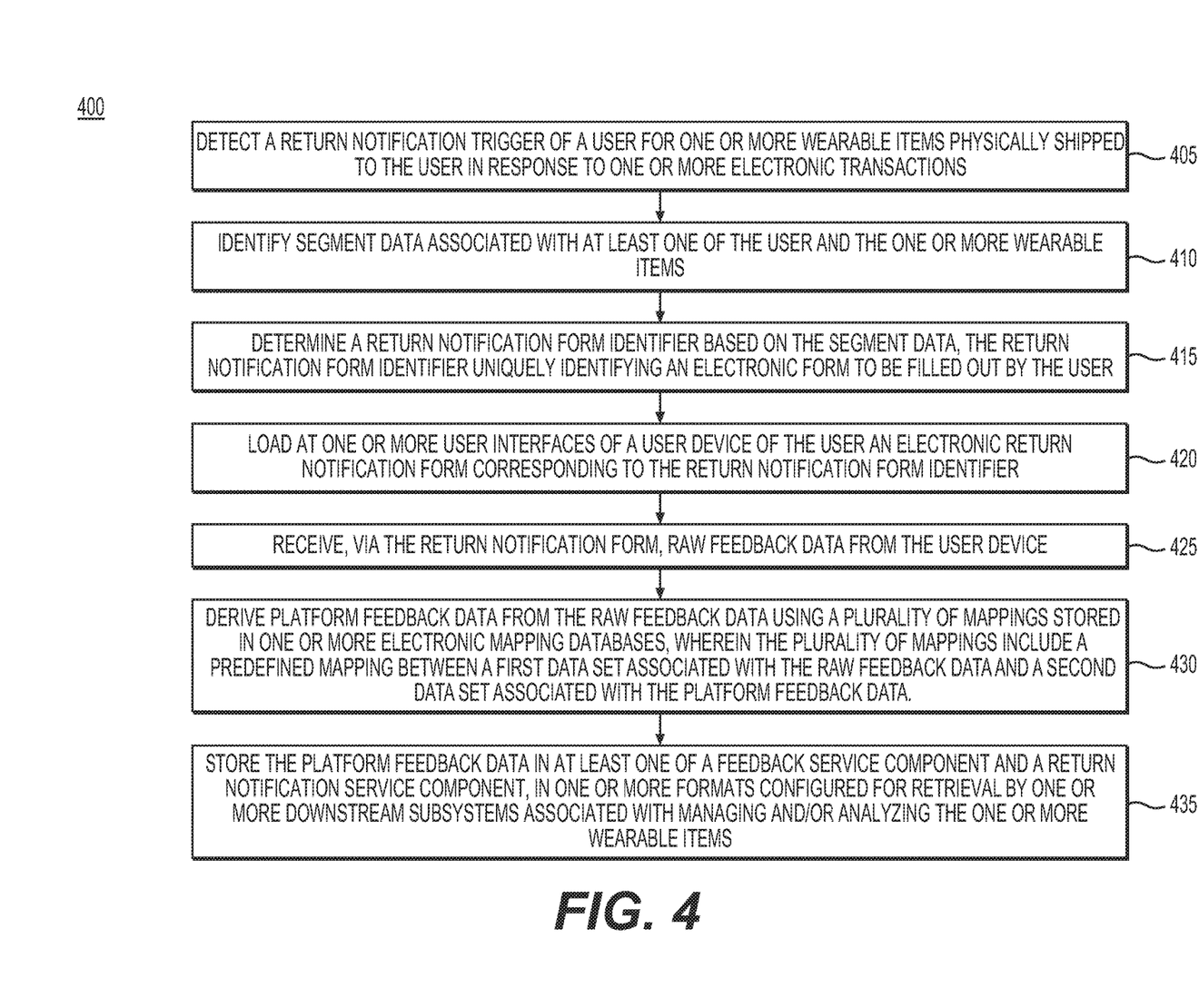
FIG. 4 depicts an exemplary method for deriving platform feedback data from raw feedback data for dynamic retrieval by downstream subsystems, according to one or more embodiments.

FIG. 4 depicts an exemplary method for deriving platform feedback data from raw feedback data for dynamic retrieval by downstream subsystems, according to one or more embodiments. The one or more processors of the server system 102 may detect a return notification trigger of a user for one or more wearable items physically shipped to the user in response to one or more electronic transactions (step 405). In response to detecting the return notification trigger, he one or more processors of the server system 102 may identify segment data associated with at least one of the user and the one or more wearable items (step 410). Then, the one or more processors of the server system 102 may determine a return notification form identifier based on the segment data, the return notification form identifier uniquely identifying an electronic form to be filled out by the user (step 415). The one or more processors of the server system 102 may load, at one or more user interfaces of a user device of the user, an electronic return notification form corresponding to the return notification form identifier (step 420). Subsequently, the one or more processors of the server system 102 may receive, via the electronic return notification form, raw feedback data from the user device (step 425). The one or more processors of the server system 102 may then derive platform feedback data from the raw feedback data using a plurality of mappings stored in one or more electronic mapping databases, wherein the plurality of mappings include one or more predefined mappings between a first data set associated with the raw feedback data and a second data set associated with the platform feedback data (step 430). After deriving the platform feedback data, the one or more processors of the server system 102 may store the platform feedback data in at least one of a feedback service component and a return notification service component, in one or more formats configured for retrieval by one or more downstream subsystems associated with managing and/or analyzing the one or more wearable items (step 435).

Although FIG. 4 shows example blocks of an exemplary method 400, in some implementations, the exemplary method 400 may include additional blocks, fewer blocks, different blocks, or differently arranged blocks than those depicted in FIG. 4. Additionally, or alternatively, two or more of the blocks of the exemplary method 400 may be performed in parallel.

Figure 5:
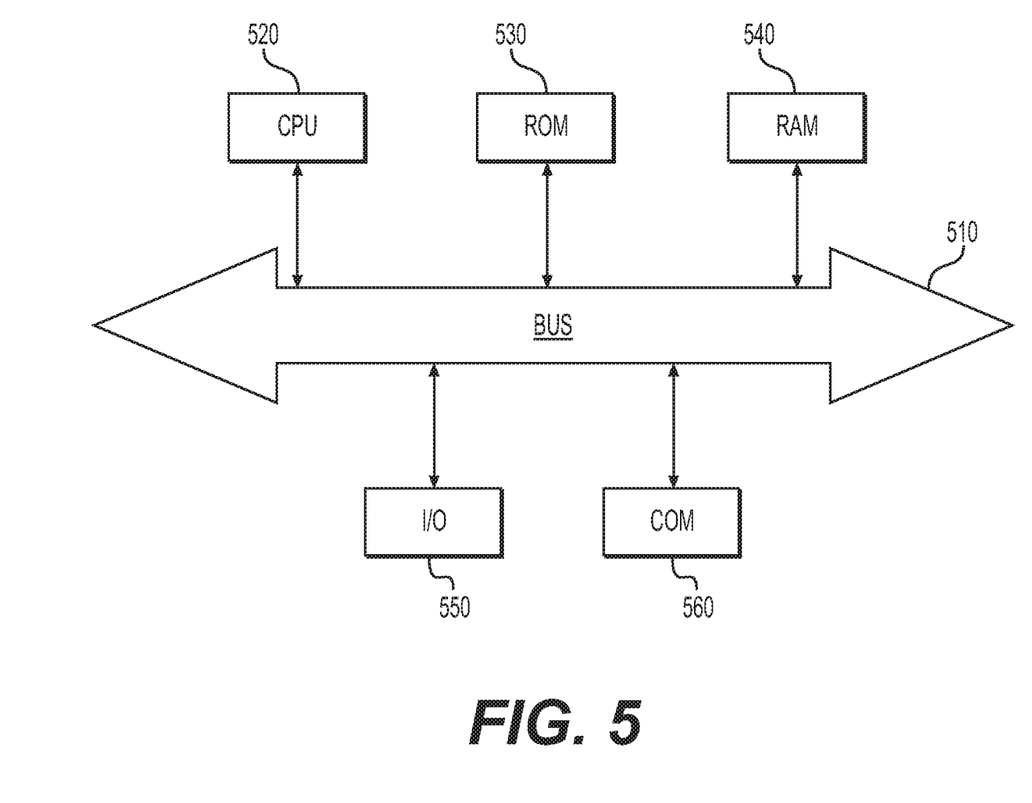
FIG. 5 depicts an exemplary computer device or system, in which embodiments of the present disclosure, or portions thereof, may be implemented.

FIG. 5 depicts an exemplary computer device or system, in which embodiments of the present disclosure, or portions thereof, may be implemented. In some implementations, the server system 102, the user devices 112, the employee devices 116, the tenant devices 120, the user device(s) 222, the controller 224, the forms management system 228, the metrics mapper component 226, the user device(s) 322, the controller 324, the forms management system 328, the metrics mapper component 326, and/or any other computer system or user terminal for performing the various embodiments of the present disclosure, may correspond to device 500. Additionally, each of the exemplary computer servers, databases, user interfaces, modules, and methods described above with respect to FIGS. 1-4 can be implemented in device 500 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-4.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the present disclosure, as described above in the examples of FIGS. 1-4, may be implemented using a processor device 500. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 5, a device 500 used for performing the various embodiments of the present disclosure (e.g., the server system 102, the user devices 112, the employee devices 116, the tenant devices 120, the user device(s) 222, the controller 224, the forms management system 228, the metrics mapper component 226, the user device(s) 322, the controller 324, the forms management system 328, the metrics mapper component 326, and/or any other computer system or user terminal for performing the various embodiments of the present disclosure) may include a central processing unit (CPU) 520. CPU 520 may be any type of processor device including, for example, any type of special purpose or a general-purpose microprocessor device. As will be appreciated by persons skilled in the relevant art, CPU 520 also may be a single processor in a multi-core/multi-processor system, such system operating alone, or in a cluster of computing devices operating in a cluster or server farm. CPU 520 may be connected to a data communication infrastructure 510, for example, a bus, message queue, network, or multi-core message-passing scheme.

A device 500 (e.g., the server system 102, the user devices 112, the employee devices 116, the tenant devices 120, the user device(s) 222, the controller 224, the forms management system 228, the metrics mapper component 226, the user device(s) 322, the controller 324, the forms management system 328, the metrics mapper component 326, and/or any other computer system or user terminal for performing the various embodiments of the present disclosure) may also include a main memory 540, for example, random access memory (RAM), and may also include a secondary memory 530. Secondary memory, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 530 may include other similar means for allowing computer programs or other instructions to be loaded into device 500. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 500.

A device 500 may also include a communications interface ("COM") 560. Communications interface 560 allows software and data to be transferred between device 500 and external devices. Communications interface 560 may include a modem, a network interface (such as an Ethernet card), a communications port, a PCMCIA slot and card, or the like. Software and data transferred via communications interface may be in the form of signals, which may be electronic, electromagnetic, optical, or other signals capable of being received by communications interface 560. These signals may be provided to communications interface 560 via a communications path of device 500, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. A device 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for generating platform feedback data from raw feedback data for dynamic retrieval by downstream subsystems of a subscription electronic transactions platform, the method comprising:

detecting, by one or more processors, a return notification trigger of a user for one or more wearable items physically shipped to the user in response to one or more electronic transactions of the subscription electronic transactions platform;

in response to detecting the return notification trigger, identifying, by the one or more processors, segment data associated with at least one of the user and the one or more wearable items shipped to the user;

determining, by the one or more processors, a return notification form identifier based on the segment data, the return notification form identifier uniquely identifying an electronic return notification form to be filled out by the user;

transmitting the electronic return notification form corresponding to the return notification form identifier for display at one or more user interfaces of a user device of the user;

receiving, by the one or more processors, via the electronic return notification form, raw feedback data from the user device relating to the one or more wearable items shipped to the user;

converting, by the one or more processors, the raw feedback data into platform feedback data having a format that is standardized across the subscription electronic transactions platform by parsing the raw feedback data into one or more attributes and deriving the platform feedback data having the format that is standardized across the subscription electronic transactions platform based on the one or more attributes using one or more predefined mappings between the raw feedback data and the platform feedback data, the one or more predefined mappings comprising (i) a first map that matches the return notification form identifier to a platform form identifier, (ii) a second map that matches one or more return notification form question identifiers to one or more platform question identifiers that are unique across a plurality of return notification forms associated with a plurality of return notification form identifiers, and (iii) a third map that matches one or more return notification form answer identifiers to one or more platform answer identifiers that are unique across the plurality of return notification forms associated with a plurality of return notification form identifiers; and storing, by the one or more processors, the platform feedback data in at least one of a feedback service component and a return notification service component, in one or more formats configured for retrieval by one or more downstream subsystems associated with managing and/or analyzing the one or more wearable items across the subscription electronic transactions platform.

2. The method of claim 1, wherein the return notification trigger comprises at least one of: a user selection to return the one or more wearable items, a user selection to generate a shipping label, and a preconfigured automated trigger.

3. The method of claim 1, wherein transmitting the electronic return notification form corresponding to the return notification form identifier for display at one or more user interfaces of the user device of the user further comprises:

generating, by the one or more processors, the electronic return notification form, using one or more forms management data sets stored in one or more forms management databases.

4. The method of claim 3, wherein the one or more forms management data sets comprise: a question pool including a plurality of question identifiers, and a question configuration data set including a map matching the return notification form identifier with a set of question identifiers among the plurality of question identifiers.

5. The method of claim 1, wherein transmitting the electronic return notification form corresponding to the return notification form identifier for display at one or more user interfaces of the user device of the user further comprises:
retrieving the electronic return notification form, by querying one or more databases using the return notification form identifier.

6. The method of claim 1, wherein converting the raw feedback data into platform feedback data having the format that is standardized across the subscription electronic transactions platform using the one or more predefined mappings stored in the one or more electronic mapping databases further comprises:
communicating with the one or more predefined mappings via an application programming interface.

7. A computer system for generating platform feedback data from raw feedback data for dynamic retrieval by downstream subsystems of a subscription electronic transactions platform, the computer system comprising:
a memory having processor-readable instructions stored therein; and
at least one processor configured to access the memory and execute the processor-readable instructions, which when executed by the at least one processor configures the at least one processor to perform a plurality of functions, including functions for:
detecting a return notification trigger of a user for one or more wearable items physically shipped to the user in response to one or more electronic transactions of the subscription electronic transactions platform;
in response to detecting the return notification trigger, identifying segment data associated with at least one of the user and the one or more wearable items shipped to the user;
determining a return notification form identifier based on the segment data, the return notification form identifier uniquely identifying an electronic return notification form to be filled out by the user;
transmitting the electronic return notification form corresponding to the return notification form identifier for display at one or more user interfaces of a user device of the user;
receiving via the electronic return notification form, raw feedback data from the user device relating to the one or more wearable items shipped to the user;
converting the raw feedback data into platform feedback data having a format that is standardized across the subscription electronic transactions platform by parsing the raw feedback data into one or more attributes and deriving the platform feedback data having the format that is standardized across the subscription electronic transactions platform based on the one or more attributes using one or more predefined mappings between the raw feedback data and the platform feedback data, the one or more predefined mappings comprising (i) a first map that matches the return notification form identifier to a platform form identifier, (ii) a second map that matches one or more return notification form question identifiers to one or more platform question identifiers that are unique across a plurality of return notification forms associated with a plurality of return notification form identifiers, and (iii) a third map that matches one or more return notification form answer identifiers to one or more platform answer identifiers that are unique across the plurality of return notification forms associated with a plurality of return notification form identifiers; and
storing the platform feedback data in at least one of a feedback service component and a return notification service component, in one or more formats configured for retrieval by one or more downstream subsystems associated with managing and/or analyzing the one or more wearable items across the subscription electronic transactions platform.

8. The system of claim 7, wherein the return notification trigger comprises at least one of: a user selection to return the one or more wearable items, a user selection to generate a shipping label, and a preconfigured automated trigger.

9. The system of claim 7, wherein transmitting the electronic return notification form corresponding to the return notification form identifier for display at one or more user interfaces of the user device of the user further comprises:
generating the electronic return notification form, using one or more forms management data sets stored in one or more forms management databases.

10. The system of claim 9, wherein the one or more forms management data sets comprise: a question pool including a plurality of question identifiers, and a question configuration data set including a map matching the return notification form identifier with a set of question identifiers among the plurality of question identifiers.

11. The system of claim 7, wherein transmitting the electronic return notification form corresponding to the return notification form identifier for display at one or more user interfaces of the user device of the user further comprises:
retrieving the electronic return notification form, by querying one or more databases using the return notification form identifier.

12. The system of claim 7, wherein converting the raw feedback data into platform feedback data having the format that is standardized across the subscription electronic transactions platform using the one or more predefined mappings stored in the one or more electronic mapping databases further comprises:
communicating with the one or more predefined mappings via an application programming interface.

13. A non-transitory computer-readable medium containing instructions for generating platform feedback data from raw feedback data for dynamic retrieval by
downstream subsystems of a subscription electronic transactions platform, the computer system comprising:
detecting a return notification trigger of a user for one or more wearable items physically shipped to the user in response to one or more electronic transactions of the subscription electronic transactions platform;
in response to detecting the return notification trigger, identifying segment data associated with at least one of the user and the one or more wearable items shipped to the user;
determining a return notification form identifier based on the segment data, the return notification form identifier uniquely identifying an electronic return notification form to be filled out by the user;
transmitting the electronic return notification form corresponding to the return notification form identifier for display at one or more user interfaces of a user device of the user;

receiving via the electronic return notification form, raw feedback data from the user device relating to the one or more wearable items shipped to the user;

converting the raw feedback data into platform feedback data having a format that is standardized across the subscription electronic transactions platform by parsing the raw feedback data into one or more attributes and deriving the platform feedback data having the format that is standardized across the subscription electronic transactions platform based on the one or more attributes using one or more predefined mappings between the raw feedback data and the platform feedback data, the one or more predefined mappings comprising (i) a first map that matches the return notification form identifier to a platform form identifier, (ii) a second map that matches one or more return notification form question identifiers to one or more platform question identifiers that are unique across a plurality of return notification forms associated with a plurality of return notification form identifiers, and (iii) a third map that matches one or more return notification form answer identifiers to one or more platform answer identifiers that are unique across the plurality of return notification forms associated with a plurality of return notification form identifiers; and storing the platform feedback data in at least one of a feedback service component and a return notification service component, in one or more formats configured for retrieval by one or more downstream subsystems associated with managing and/or analyzing the one or more wearable items across the subscription electronic transactions platform.

14. The non-transitory computer-readable medium of claim 13, wherein the return notification trigger comprises at least one of: a user selection to return the one or more wearable items, a user selection to generate a shipping label, and a preconfigured automated trigger.

15. The non-transitory computer-readable medium of claim 13, wherein transmitting the electronic return notification form corresponding to the return notification form identifier for display at one or more user interfaces of the user device of the user further comprises:

generating the electronic return notification form, using one or more forms management data sets stored in one or more forms management databases.

16. The non-transitory computer-readable medium of claim 15, wherein the one or more forms management data sets comprise: a question pool including a plurality of question identifiers, and a question configuration data set including a map matching the return notification form identifier with a set of question identifiers among the plurality of question identifiers.

17. The non-transitory computer-readable medium of claim 13, wherein transmitting the electronic return notification form corresponding to the return notification form identifier for display at one or more user interfaces of the user device of the user further comprises:

retrieving the electronic return notification form, by querying one or more databases using the return notification form identifier.

18. The method of claim 1, wherein the first map includes a plurality of return notification form identifiers that respectively correspond to a plurality of return notification form versions.

19. The method of claim 18, further including dynamically updating the second map and the third map based on the first map.

20. The method of claim 19, further including varying the plurality of return notification form versions based on the segment data associated with the one or more wearable items shipped to the user.

* * * * *